Figures 1, 2, 3:
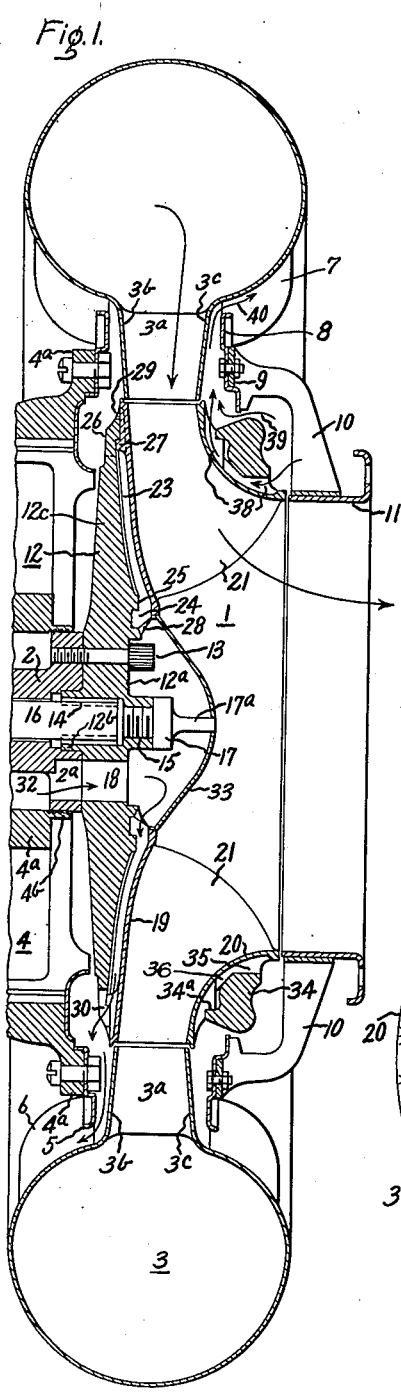

June 30, 1953

K. D. McMAHAN 2,643,851

TURBO-MACHINE ROTOR WITH COOLING MEANS

Filed May 27, 1948

Inventor:
Kenton D. McMahan,
by Prowell P. Mack
His Attorney.

Patented June 30, 1953

2,643,851

UNITED STATES PATENT OFFICE 2,643,851

TURBO-MACHINE ROTOR WITH COOLING MEANS

Kenton D. McMahan, Schenectady, N. Y., assignor to General Electric Company, a corporation of New York Application May 27, 1948, Serial No. 29,456

5 Claims. (Cl. 253—39.15)

This invention relates to high-speed rotors for high-temperature operation, specifically to a "radial-in-flow" type of turbine rotor for high-temperature application, as in gas turbine powerplants.

Since the turbine rotor is ordinarily the most highly-stressed component in a gas turbine powerplant, it is of the utmost importance to carefully design this element so that it may safely operate at very high temperatures over long periods of time between disassembly for inspection and overhaul. Because of the sharp falling off in strength of the metallic alloys used in such rotors, it is important to provide a cooling arrangement to improve the strength of the materials and reduce high-temperature "creep" so as to lengthen the useful operating life of the rotor.

Accordingly it is an object of the present invention to provide an improved high-temperature gas turbine rotor structure, in which the hot gas passages are formed of a cast material having good temperature resistance but relatively poor tensile strength, supported on a disk of readily forgeable material having excellent strength but less resistance to temperature, the design being such that the high-temperature walls are air cooled and the transfer of heat from the hot gas passage walls to the supporting disk is kept to a minimum.

Other objects and advantages will be apparent from the following description taken in connection with the accompanying drawings, in which Fig. 1 is a sectional assembly view showing my improved turbine rotor in cooperative relation with a nozzlebox and related framework; Fig. 2 is a view in elevation, with certain parts broken away to show the structure of other parts, of the back side of the rotor by itself; while Fig. 3 is a similar elevation view of the front side of the rotor by itself.

Referring now more particularly to Fig. 1, the rotor, indicated generally at 1, has a hub portion secured to a shaft 2, which is in turn supported in suitable bearings, not shown. Surrounding the rotor is a nozzlebox indicated generally at 3, which is substantially toroidal in shape and is provided with a circumferential row of nozzles formed by spaced blades 3a, which blades may be welded to the substantially parallel radially extending side walls 3b, 3c. The framework supporting the rotor and nozzlebox in cooperative relation includes a casting indicated generally at 4, which supports the rotor bearings and has a circumferential flanged portion 4a to which is bolted a sheet metal ring 5, in a manner which will be apparent from Fig. 1. Secured to ring 5, as by welding, are a plurality of radially extending ribs 6, which are in turn welded to the inner surfaces of the nozzlebox whereby the latter is supported from flange 4a. The other side of the nozzlebox is provided with similar inwardly extending ribs 7 welded to a ring 8 bolted to a cooperating ring 9, to which are secured other radially inwardly extending struts 10 supporting a suitable flanged turbine discharge conduit connection 11.

The rotor proper, as shown in Fig. 1, comprises a radially extending "support disk" 12 having a hub portion 12a which may be secured by a plurality of circumferentially spaced threaded fastenings 13 to the flanged end portion 2a of shaft 2. The central portion of hub 12a is provided with an axially extending boss 12b fitting a recess in the end of shaft 2 for the purpose of accurately centering the disk 12 relative to the shaft. Projecting through the hub portion of the disk 12 is an axial bore having a left-hand portion indicated at 14 and a smaller diameter right-hand portion indicated at 15. The bore portion 14 is provided with key-ways or splines adapted to cooperate with mating portions on the extreme end of a shaft 16. Shaft 16 may be adapted to transmit torque to a load device or to various auxiliary components of a gas turbine power plant, not shown. The bore portion 15 is threaded to receive a cap or plug 17 having an axially extending portion 17a the function of which will be seen hereinafter. The hub portion of the disk 12 also defines a plurality of circumferentially spaced axial openings 18 located between the holes 13a provided for the threaded fastenings 13. The disk 12 is preferably forged of a suitable metal having good strength properties at temperatures below 1000° F., for instance an alloy steel which is a modification of that known as "SAE-4340," and has the following percentage composition:

| | |
|---|---|
| C | .45 (max.) |
| Ni | 2.25 (min.) |
| Mn | 1. (max.) |
| Cr | 1.25 (max.) |
| Si | .15 (min.) |
| Mo | .5 (max.) |
| V | .12 (max.) |
| P | .05 (max.) |
| S | .05 (max.) |
| Balance | Fe |

The hot gas passages of the rotor are formed by a rear annular wall 19, an axially spaced front annular wall 20 and a plurality of circumferentially spaced radially extending blades 21, which are secured to or formed integral with the circumferential walls 19, 20. In order to withstand gas temperatures in the neighborhood of 1600° F., these walls 19, 20, 21 are preferably formed of a cast material having excellent temperature resistance, for instance that known to the trade as "Vitallium," having approximately the following percentage composition:

| | |
|---|---|
| C | .25 |
| Cr | 27.5 |
| Mo | 5.6 |
| Ni | 3.25 (max.) |
| Fe | 2. (max.) |
| Balance | Co |

This material cannot be readily forged and therefore is cast to shape. The walls 19, 20, 21 may be fabricated as a plurality of integral cast shells divided along radial planes as indicated by the lines 22 in Fig. 2, so that each shell comprises a portion of the circumferential walls 19, 20 and one or more of the radially extending blades 21. These shell segments may conveniently be formed by the "lost wax" method of precision casting, which produces a finish sufficiently smooth that little or no machine work is required on the segment as cast. As may be seen from Figs. 1 and 2, on their rearward surface these cast segments are provided with radially extending ribs 23 terminating at their inner ends in "lugs" 24 adapted to engage an annular groove formed in the adjacent face of the support disk 12. This groove defines an annular portion 25 defining an inwardly facing circumferential shoulder against which the lugs 24 are forced by centrifugal action during operation. Thus it will be seen that the inner portions of the segments are secured by a "tongue-and-groove" connection to disk 12. Similarly, the outer circumferential or rim portion of the support disk 12 is provided with circumferentially spaced portions 26 defining an inwardly facing shoulder against which seats a lug or shoulder 27 cast integral with the radially outer portion of the shell. The shouldered portions 26 constitute in effect, a "discontinuous rabbet" surface for engagement by the cast shells.

In fabricating the rotor, the separately cast shell segments may be welded together along the dividing lines 22 indicated in Fig. 2, and then the complete ring of high-temperature shells may be machined accurately to form the surfaces of the lugs 24, 27 so that they will cooperate exactly with the mating groove and rabbet portions 25, 26 of the support disk 12. The ring of shells may then be secured to the disk 12, as by welding at 28 and 29 in Fig. 1. It will be observed that the radially extending ribs 23 do not actually contact the adjacent web portion 12c of disk 12 but are somewhat spaced therefrom so as to reduce to a minimum the "solid contact area," thereby reducing the flow of heat by conduction from the high-temperature shells to the support disk 12. The area of direct metal-to-metal contact adjacent the lugs 24, 27 is likewise kept to a minimum.

As may be seen in Fig. 2, the circumferentially spaced rim portions 26 of the support disk 12 cooperate with the shoulder portions 27 of the shells to define a plurality of circumferentially spaced openings 30 communicating with the radially extending passages 19a defined between the ribs 23 and the adjacent surfaces of web 12c and wall 19. The radially inner portion of these passages are provided with entrance portions 31 defined between the respective lugs 24. It will now be apparent that the rearward surface of the wall 19 and related parts cooperate with the adjacent web portion 12c of support disk 12 to define radially extending cooling passages, to which a suitable coolant fluid, for instance air, is supplied in the following manner. Spaced from the disk hub portion 12a is a somewhat hemispherical or conical cooling shroud 33 having a circumferential portion adapted to snugly engage the inner periphery of the wall portions 19, and a central portion welded to the outer end of the projection 17a of the plug 17. It will be apparent from Fig. 1 that this shroud defines with the hub portion of the disk 12 a cooling air innermost chamber communicating with the inlet ends of the radially extending passages 19a defined between the ribs 23. By simply unscrewing the shroud 33, as by a suitable wrench engaging a polygonal socket (not shown) in the end of projection 17a, ready access may be had to the shaft fastening bolts 13.

In order to admit coolant fluid to the rearward side of the high-temperature shells, comparatively cool ambient air may be admitted to the annular passage 32 defined between the shaft 2 and adjacent enclosing portions 4a of the housing 4. The annular wall portion 4a may be provided with a labyrinth seal indicated at 4b cooperating with the outer circumference of flange 2a so as to prevent leakage of coolant. The flange 2a is provided with a plurality of openings communicating between the passage 32 and the openings 18 in the rotor hub portion. It will be apparent that during high-speed rotation, centrifugal action will cause air to be drawn in through the passage 32, the cooperating openings in the flange 2a and the hub portion of the support disk 12, this air then flowing from the inlet chamber defined by the shroud 33 to the various radially extending passages 19a defined between the wall 19 and disk 12. The spent coolant is discharged through the peripheral openings 30, as indicated by the arrows in Fig. 1, and flows between the nozzle box wall 3b and the adjacent ring 5, so that the outer nozzle ring walls are also cooled.

It will be apparent from the above that the rearward hot gas passage wall 19 is reinforced by the inner and outer fits provided with the cooperating shoulders on the support disk 12. The front wall or shroud 20 also requires reinforcing, and this is effected by the special reinforcing ring 34, which is designed and arranged in accordance with my prior Patent 2,392,858 issued January 15, 1946, and assigned to the same assignee as the present application. This ring is forged of any suitable high strength alloy steel material, for instance that known to the trade as "Seminole" and having the following approximate composition:

| | |
|---|---|
| C | .45 |
| Cr | 1.30 |
| W | 2. |
| V | .25 |
| Balance | Fe |

At its inner periphery this reinforcing ring engages shoulder portions 35 formed at the radially inner ends of a plurality of circumferentially spaced ribs 36, as may be seen in Figs. 1 and 3. Ribs 36 are of course cast integral with the outer shroud or wall 20 as indicated in the drawings. Half of each rib 36 may be cast integral with one of each pair of adjacent segments, and the segments may then be secured together by welding these ribs together along the separation planes indicated by the radial lines 37 in Fig. 3. The outer portion of the reinforcing ring 34 has an inwardly facing circumferential shoulder 34a engaging cooperating shoulders formed on the radially outer portions of the ribs 36. Each cast segment is provided between the main ribs 36 with auxiliary ribs 36a also forming shoulders engaged by the portion 34a of the reinforcing ring.

The reinforcing ring 34 is preferably assembled to the rotor with a shrink fit, as described more particularly in my Patent No. 2,392,858. Since the strength of the material of which the reinforcing ring is fabricated is also seriously reduced as the operating temperature increases, it is important that the ring be cooled. This is effected by means of the cooling air passages 35a defined between the ring and the adjacent but spaced shroud wall 20, the radially extending ribs 36, 36a serving as centrifugal impeller blades to cause a forced circulation of ambient air between the ring and shroud, as indicated by the flow arrows 38 in Fig. 1. It will also be observed that the conduction of heat from the shroud wall 20 to the reinforcing ring 34 is kept to a minimum by reason of the small metal-to-metal contact between the two. The high velocity air flow indicated by arrows 38 in Fig. 1 will tend to induce a further flow of cooling air around ring 34 in the manner indicated by arrow 39 in Fig. 1. It will be seen that the ring 8 in Fig. 1 serves as a cooling air shroud to direct the flow indicated by arrows 38, 39 along the outer surface of nozzle box wall 3c, this flow discharging to atmosphere as indicated by arrow 40.

It will be apparent from the above description that in my improved rotor structure the "load-carrying function" is to a large extent separated from the "hot-gas-conducting function." The first function is performed by the high-strength forged disk 12 and reinforcing ring 34. These load-carrying elements are, by reason of the cooling air flow arrangements described above, maintained at a comparatively low temperature, for instance of the order of 500 to 600° F., at which temperature they are well able to support the centrifugal stresses encountered. The second function is performed by the cast shells, which are of a material well able to withstand the extreme temperatures encountered in gas turbine operation. By reason of the mechanical design of the rotor, the stresses set up in the cast shells by centrifugal force are transferred to the reinforcing ring 34 and the supporting disk 12. Tests with operating fluid at temperatures in the neighborhood of 1500° F. indicate that fabricated rotors of about 8" diameter arranged in accordance with the invention are well able to withstand the temperature and centrifugal stresses encountered in gas turbine operation at speeds of the order of 30,000 R. P. M. without showing signs of warping, creep, or other deterioration.

It will be apparent to those skilled in the art that certain changes in the arrangement described may be made. For instance, instead of casting the high-temperature shells separately and then welding them together to form a complete ring, as described above, all shells may be cast as a single integral ring if suitable casting procedures are available. This complete ring of gas passages would then be secured to the support disk 12 by welds at 28, 29. While the structure has been described as a turbine rotor, it will be obvious that the invention is applicable to turbo-machine rotors generally, whether used as a turbine or compressor. While certain metal alloy materials have been suggested, it will be apparent that many others could be used. Specifically, the walls forming the hot gas passages might be made of a suitable ceramic material such as pure fused quartz.

While only one modification of the invention has been disclosed in detail, it will be apparent that many changes may be made without departing from the invention, and I intend to cover by the appended claims all such modifications as fall within the true spirit and scope thereof.

What I claim is:

1. A centrifugal type turbo-machine rotor for high-temperature operation comprising a disk member having hub, web, and rim portions fabricated of metal having good strength at temperatures below 1000° F., a shroud member supported in spaced relation with the front side of the hub portion to define a cooling fluid inlet chamber, said hub portion forming at least one axial coolant passage communicating with said chamber, and walls of a material having good resistance to temperatures above 1000° F. and forming a plurality of radially extending circumferentially spaced hot fluid passages and including a substantially radially extending annular rear wall having an inner periphery adjacent the outer periphery of the shroud and an other periphery adjacent the rim portion of the disk, a curved axially and radially extending front wall having an outer diameter substantially equal to that of the rear wall, and a plurality of radially extending blades connected to said front and rear walls, the rear walls having circumferentially spaced portions forming an interfitting tongue and groove connection with the disk hub portion and other spaced portions forming a rabbet connection with the disk rim portions whereby centrifugal forces on the rear wall are transmitted to the disk, said spaced portions supporting the rear wall in axially spaced relation with the disk web portion with a minimum solid contact area and forming radially extending coolant flow paths having inner end portions communicating with the coolant inlet chamber and outer end portions discharging at the disk rim, the front annular wall having exterior radially extending circumferentially spaced ribs defining spaced shoulder portions, and a reinforcing ring of material having good strength properties at temperatures below 1000° F. and surrounding the front wall in spaced relation thereto and engaging said spaced shoulder portions with a minimum solid contact area whereby conduction of heat from front wall to ring is minimized and radially extending coolant passages are formed therebetween.

2. A centrifugal turbo-machine rotor for high-temperature operation comprising a supporting disk member, an annular member having walls defining radially extending hot fluid passages and including axially spaced annular front and rear walls, and a reinforcing ring surrounding the front annular wall, the disk and rear wall having spaced interfitting portions whereby the rear wall is supported in axially spaced relation with the disk to form radially extending coolant flow paths and allow centrifugal forces in the rear wall to be transferred to the disk, the front annular wall having circumferentially spaced portions forming shoulders tightly engaging the reinforcing ring, the ring and front wall defining radially extending coolant flow paths between said shoulder portions whereby the ring is cooled and the conduction of heat thereto from the front wall is minimized, the hub portion of the disk member forming at least one coolant inlet passage communicating with the radial coolant passages between the disk and rear wall.

3. A centrifugal type turbo-machine rotor for high-temperature operation comprising a shaft, a disk member, an annular member having axially spaced front and rear wall portions connected by radially extending blades to form hot fluid passages, and a reinforcing ring surrounding the front wall in axially and radially spaced relation thereto, the rear wall and disk having spaced interfitting portions whereby the rear wall is supported in axially spaced relation to the disk to form radially extending coolant passages, the front wall having exterior circumferentially spaced portions engaging the reinforcing ring to form radially extending coolant passages therewith, means securing the hub portion of the disk to the supporting shaft, and a shroud member in axially spaced relation with the hub portion of the disk and defining therewith a coolant inlet chamber communicating with the coolant passages between said rear wall and disk, means for detachably connecting the shroud to the hub portion whereby ready access is provided to the shaft securing means, the disk hub portion having at least one coolant inlet passage communicating with said chamber.

4. A centrifugal type turbo-machine rotor for high-temperature operation comprising a disk member fabricated of metal having good strength at temperatures below 1000° F., and walls of a material having good resistance to temperatures above 1000° F. and forming a plurality of radially extending circumferentially spaced hot fluid passages, said walls including a substantially radially extending annular rear wall having an inner peripheral portion and an outer peripheral portion adjacent the rim portion of the disk, an annular radially extending front wall having an outer diameter substantially equal to that of the rear wall, and a plurality of radially extending blades connected to said front and rear walls, the inner peripheral portion of the rear wall defining circumferentially spaced portions forming an interfitting tongue and groove connection with the hub portion of the disk, said outer peripheral portion of the rear wall forming circumferentially spaced portions defining a rabbet connection with the disk rim portion whereby centrifugal forces on the rear wall are transmitted to the disk, said spaced inter-engaging portions supporting the rear wall in axially spaced relation with the disk web portion with a minimum of contact area therebetween, the front annular wall having exterior radially extending circumferentially spaced ribs defining spaced shoulder portions and a reinforcing ring of material having good strength properties at temperatures below 1000° F. and surrounding the front wall in spaced relation thereto and engaging said spaced shoulder portions with a minimum contact area therebetween, whereby conduction of heat from the front wall to the ring is minimized and radially extending coolant passages are formed therebetween.

5. A centrifugal turbo-machine rotor for high-temperature operation comprising a hub portion, a web portion, an annular member supported on the web and defining a central axially directed opening and a plurality of radially extending passages for hot fluid communicating at their innermost portions with said central opening, the web and a portion of said annular member defining a plurality of circumferentially spaced radially extending coolant passages, means for detachably securing the hub to a supporting shaft in overhung relation thereto, a substantially conical shroud spaced axially from the hub to define a coolant inlet chamber communicating with the radially inner portions of said coolant passages, said conical shroud having a circumferential portion contacting the innermost circumferential portion of said annular member at a location radially outwardly from the shaft fastening means and the coolant passage inlets, means detachably securing the shroud to the hub for ready access to the hub securing means, the hub defining at least one coolant supply passage extending axially through the hub and communicating with said coolant inlet chamber, whereby cooling fluid may be supplied to the rotor from the shaft side thereof.

KENTON D. McMAHAN.

References Cited in the file of this patent

UNITED STATES PATENTS

| Number | Name | Date |
|---|---|---|
| 2,401,826 | Halford | June 11, 1946 |
| 2,447,292 | Van Acker | Aug. 17, 1948 |
| 2,473,356 | Birmann | June 14, 1949 |
| 2,487,532 | Eastman | Nov. 8, 1949 |